United States Patent [19]

Sara

[11] Patent Number: 5,045,269
[45] Date of Patent: Sep. 3, 1991

[54] METHOD FOR SINTERED SHAPES WITH CONTROLLED GRAIN SIZE

[75] Inventor: Raymond V. Sara, Strongsville, Ohio

[73] Assignee: Union Carbide Coatings Service Technology Corporation, Danbury, Conn.

[21] Appl. No.: 635,383

[22] Filed: Feb. 1, 1991

Related U.S. Application Data

[63] Continuation of Ser. No. 272,419, Nov. 17, 1988, abandoned.

[51] Int. Cl.$^5$ .............................................. C04B 35/58
[52] U.S. Cl. ...................................... 264/332; 264/56; 501/90; 501/96
[58] Field of Search .................... 501/90, 96; 264/332, 264/56

[56] References Cited

U.S. PATENT DOCUMENTS

| | | | |
|---|---|---|---|
| 2,907,972 | 10/1959 | Schildhauer | 501/90 |
| 3,400,081 | 9/1968 | Lewis et al. | 204/67 |
| 3,661,736 | 5/1972 | Holliday | 204/67 |
| 4,108,929 | 8/1978 | Prochazka | 501/90 |
| 4,230,497 | 10/1980 | Schwetz | 501/90 |
| 4,275,026 | 6/1981 | Hazel | 501/96 |
| 4,308,114 | 12/1981 | Das et al. | 204/67 |
| 4,376,029 | 3/1983 | Joo et al. | 204/294 |
| 4,377,463 | 3/1983 | Joo et al. | 204/294 |
| 4,439,382 | 3/1984 | Joo et al. | 264/295 |
| 4,465,581 | 8/1984 | Juel et al. | 204/290 |
| 4,492,670 | 1/1985 | Mizrah et al. | 419/9 |

Primary Examiner—James Derrington
Attorney, Agent, or Firm—E. Lieberstein

[57] ABSTRACT

A method for producing sintered shapes of refractory powders with improved strength and toughness using a grain growth inhibiting powder to inhibit grain growth.

7 Claims, 2 Drawing Sheets

METHOD FOR SINTERED SHAPES WITH CONTROLLED GRAIN SIZE

This application is a continuation of prior U.S. application Ser. No. 272,419 filed Nov. 17, 1988 now abandoned.

FIELD OF THE INVENTION

The present invention relates to the manufacture of hot-pressed shapes of metal borides and monocarbides particularly $TiB_2$ and SiC.

BACKGROUND OF THE INVENTION

In the manufacture of hot-pressed or sintered metal carbides and borides from powders, a powder, such as $TiB_2$, is compressed in a mold at an elevated temperature to sinter the particles of the powder together. Often, these sintered shapes are highly stressed and have poor resistance to mechanical and thermal shock. This is believed to be due in large part to the thermal anisotropy of many of these materials, such as $TiB_2$, and the large grain or particle size in the sintered shapes. Even though finely divided powders may be employed to form the sintered shapes, the temperatures and pressures in which sintered shapes are commonly formed contribute to grain growth, resulting in sintered shapes with undesirably large grain size.

The effect of large grain size can be shown by the well-known Griffith-Irwin fracture equation. According to this equation, the strength (S) of ceramics is a function of the critical flaw size (c), and the stress intensity factory (Kc) as follows:

$$S = \frac{(Kc)}{(Y)(c)}$$

wherein Y is a geometrical factor. Critical flaws are usually related to grain size, i.e. large grains will geometrically accommodate larger defects in the sintered shape. Therefore, the critical flaw size of sintered bodies with large grain size will generally be greater, and the strength will be smaller, than for sintered bodies with a smaller grain size. In addition, for thermally anisotropic materials, like $TiB_2$, the tendency for cracks developing in the grains or crystallites themselves or in grain boundaries increases with the grain size. Thus, in order to maximize the strength of sintered bodies, and minimize the tendency of crack formation in the crystallites and grain boundaries, it is desirable to maintain as low a grain size as possible.

An additional problem is that the network of cracks formed in large grained sintered structures affect not only the mechanical properties, such as strength, Young's modulus, fracture toughness, and the like, but also increase the permeability of the structure to molten metals and gasses, which is often undesirable for sintered shapes used in refractory applications.

Because of the difficulty in forming small grain sintered bodies, due to grain growth during formation of the body, there is a need for a method wherein sintered bodies can be formed without the formation of large grains.

U.S. Pat. No. 4,308,114, issued to Das et al., discloses the manufacture of titanium diboride electrodes for Hall cells using a small amount of carbonaceous material to act as a scavenger during the sintering of the shape.

U.S. Pat. No. 3,661,736, issued to Holliday, discloses the manufacture of electrodes for Hall cells comprising graphite and 2 to 50 volume percent refractory hard metal.

OBJECTS OF THE INVENTION

It is, therefore, an object of the invention to provide a method for sintering shapes from powders such as those of transition metal monocarbides and borides, wherein the grain growth is minimized to form a small grain sintered structure.

Other objects of the invention will become evident in the discussion that follows.

SUMMARY OF THE INVENTION

An embodiment of the invention is a method for producing a molded refractory shape, which comprises:
  (a) providing a grain growth inhibiting powder;
  (b) providing a refractory powder nonreactive with the grain growth inhibiting powder and having less than 1.5 weight percent oxygen;
  (c) mixing between 95 and 99.5 weight percent, based upon the total weight of the mixture, of the refractory powder and between 0.5 and 5 weight percent, based upon the total weight of the mixture, of the grain growth inhibiting powder; and
  (d) compressing the mixture at pressure and temperature sufficient to sinter the refractory powder.

The refractory powders used in the process of the invention are those having a chemical compatibility with the grain growth inhibiting powder, such that they do not significantly chemically react with the grain growth inhibiting powder during the sintering of powder. These include $B_4C$, SiC, and transition metal borides and monocarbides. Of particular commercial interest are $TiB_2$ and SiC.

The oxygen content of the refractory powder should be preferably as low as possible. If the oxygen content of the refractory powder is higher than about 1.5 wt. %, the grain growth inhibitor, particularly if the grain growth inhibitor is graphite, reacts with the oxygen, leaving little or no grain growth inhibiting powder to function as a grain growth inhibitor. Accordingly there is little or no improvement in the toughness of the sintered body. To minimize the effect of excess oxygen content, the oxygen content of refractory powder is preferably less than about 0.5 wt. % oxygen.

The particle size of the refractory powder should be as small as practical, as the particle size of the powder determines the lowest possible grain size of the sintered shape. Very small powder sizes, however, may have an excessive oxygen content, and may even be pyrophoric in air Typically, refractory powders with an average particle size less than 10 microns and greater than 0.5 microns are suitable. Preferably the refractory powders have an average particle size between about 1 and 5 microns.

The grain growth inhibiting powder is preferably graphite, but may be a powdered material with a graphite-like crystal structure, such as boron nitride. Preferred materials have a well developed crystal structure, and include for example, synthetic graphite, and natural graphite. Graphite fibers may also be used, but are less preferred. The particle size of the grain growth inhibiting powder is not critical, but should be sufficiently fine to allow even distribution of the grain growth inhibiting powder through the refractory powder when the two are mixed. For the same reason, a narrow size distribution of the powder is preferred.

The grain growth inhibiting powder is added in an amount sufficient to prevent excessive grain growth. Since the grain growth inhibiting powder, beyond the grain growth inhibition, gives little or no contribution to the strength of the sintered body, amounts of grain growth inhibiting powder beyond the amount required to inhibit grain growth, about 5 wt. %, are not preferred. Suitable amounts of grain growth inhibiting powder are typically between 0.5 and 5 wt. %, preferably between 1 and 5 wt. %, with between 95 and 99.5 wt. %, preferably between 95 and 99 wt. %, of the refractory powder.

DESCRIPTION OF THE INVENTION

Figure 1:
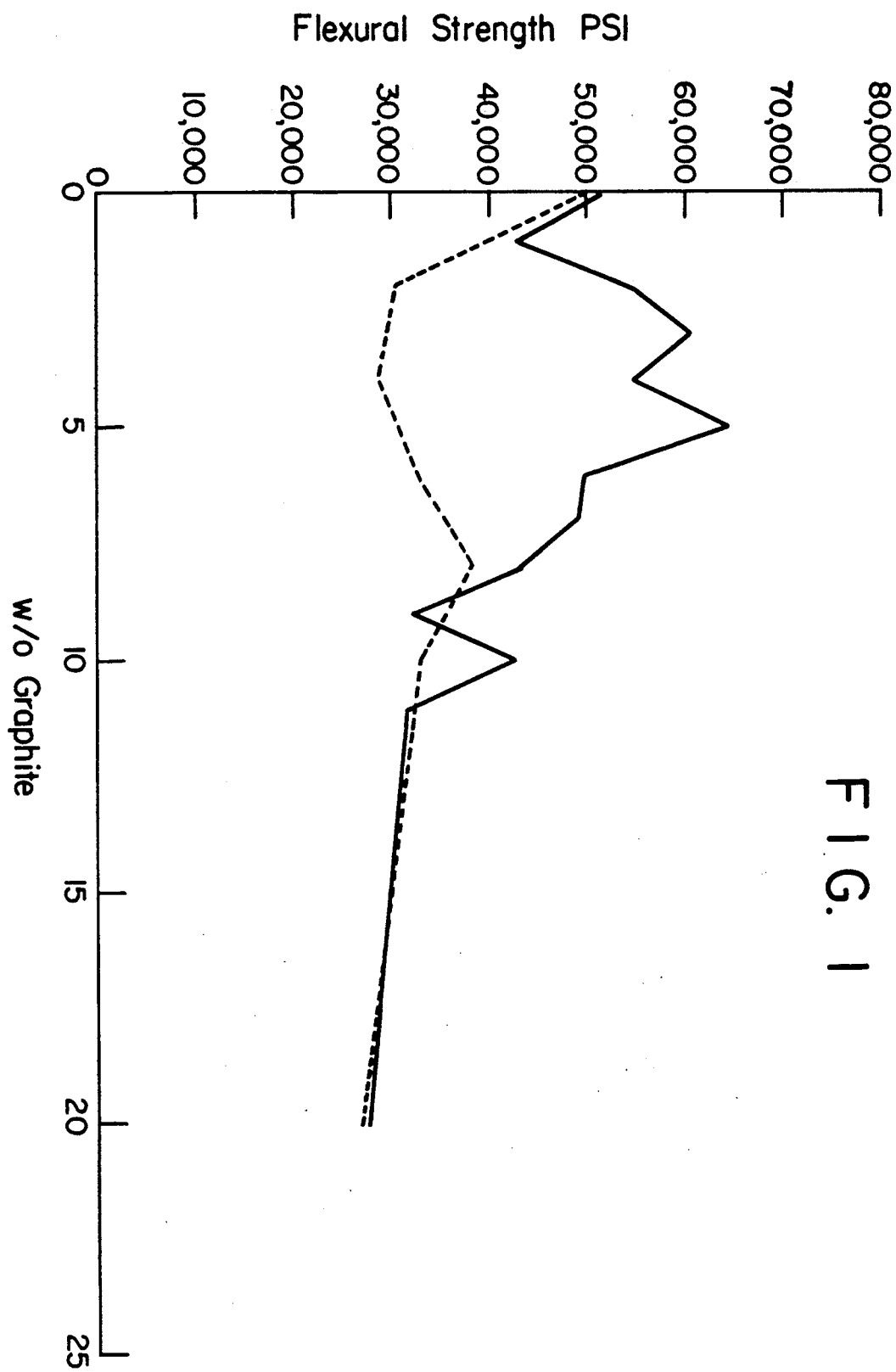
FIG. 1 is a graph showing the graphite content and the strength of sintered shapes of the invention and comparative sintered shapes.

In the examples that follow, the following refractory powders and grain growth inhibiting powder were used;

Grade A $TiB_2$—A $TiB_2$ powder with an average particle size of approximately 2 microns and a total oxygen content near 2.5 weight percent.

Grade C $TiB_2$—A $TiB_2$ powder with an average particle size of approximately 8 microns, an oxygen content of about 0.3 weight percent, and available from H. Starck, 280 Park Avenue, New York, N.Y. 10017.

Graphite A—A synthetic graphite prepared by graphitizing an isotropic coke with spherically shaped particles and which produces a graphite with a high coefficient of thermal expansion. Graphite A has an average particle size of about 15 microns with the largest particles about 75 microns in diameter.

The flexural strength in the examples below was measured on samples 6 mm square and 36 mm in length employing the ASTM C-790 test procedure.

EXAMPLE I

A mixture of 5 wt. % graphite and 95 wt. % refractory powder (5 grams Graphite A powder and 95 grams of Grade C $TiB_2$ powder) was dry blended for 24 hours in a one-gallon can having internal fins and containing a small length of chain. Thirty-five grams of the mixture were charged into a 3.8 cm diameter graphite mold. The mold was placed into a chamber and the mold and chamber evacuated to $5 \times 10^{-5}$ Torr and then purged with argon. The powder was then hot-pressed under a pressure of 28 Mpa, and at a temperature of 2000° C. for one hour producing a sintered shape in the form of a disk. The shape was allowed to cool and was removed from the mold. The density of the shape was 98.8% of theoretical (calculated on the basis of weight fractions of $TiB_2$ and C, and their respective densities 4.52 g/cm3 and 2.25 g/cm3). The flexural strength was 445 Mpa ($64.4 \times 10^3$ psi).

EXAMPLE II

Figure 2:
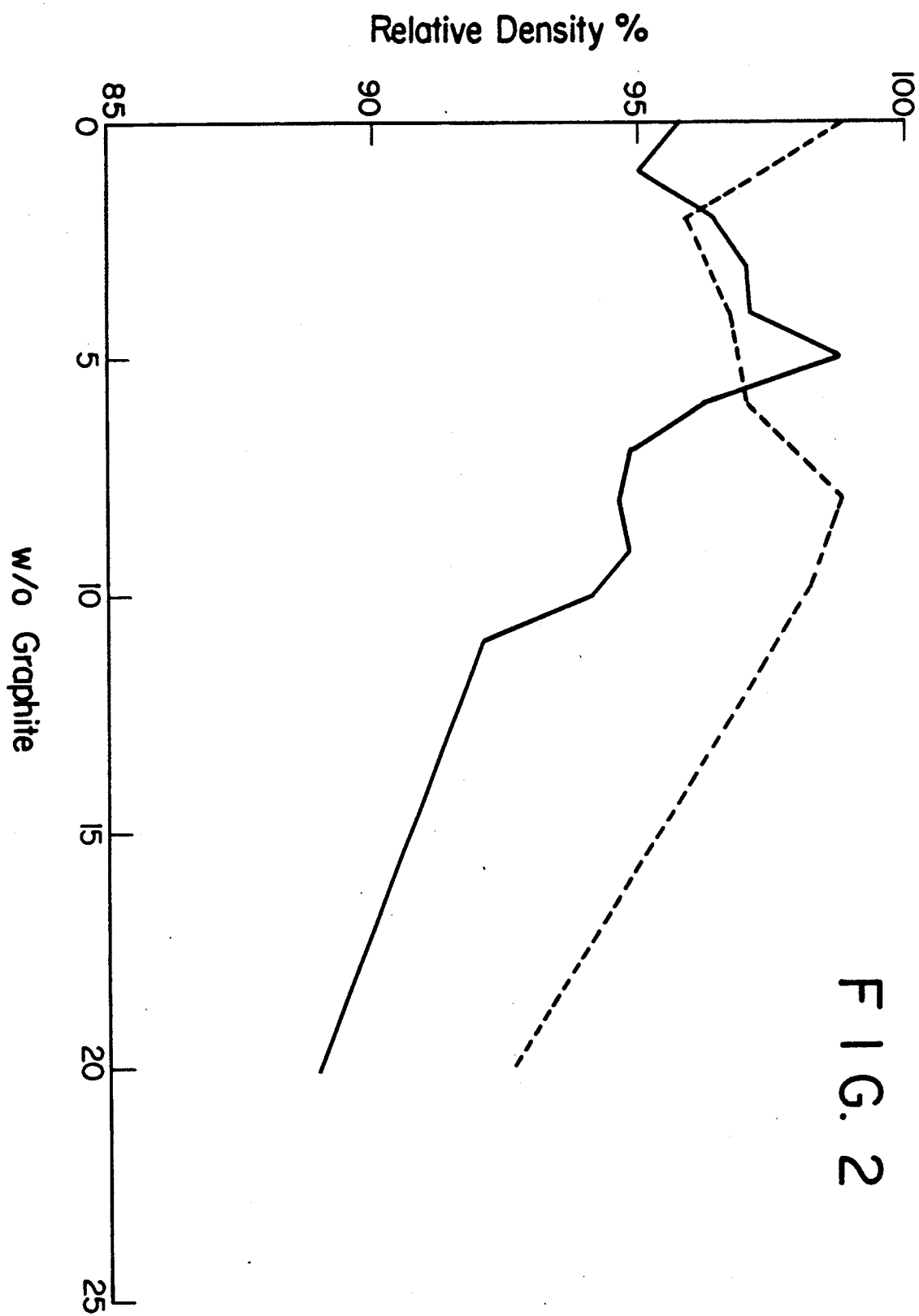
FIG. 2 is a graph showing the graphite content and the density of sintered shapes of the invention and comparative sintered shapes.

Sintered shapes were produced and tested as in Example I, except the amounts of graphite and $TiB_2$ powders were adjusted as shown in Table A below. The flexural strengths and density are summarized in Table A, and in FIG. 1, showing the flexural strength, and FIG. 2, showing the density. The density is shown as the percentage relative to the theoretical density. In FIGS. 1 and 2, the flexural strength and density values for this example are shown by the circles (o). The solid line in FIG. 1 shows the strength values for this example. The solid line in FIG. 2 shows the density values for this example.

TABLE A

| Graphite - Grade C Titanium Diboride Shapes | | | |
|---|---|---|---|
| Graphite (wt. %) | $TiB_2$ (wt. %) | Flexural Strength (psi × $10^3$) | Density (%) |
| 0 | 100 | 51.2 | 95.7 |
| 1 | 99 | 42.6 | 95.0 |
| 2 | 98 | 54.3 | 96.4 |
| 3 | 97 | 60.5 | 97.0 |
| 4 | 96 | 54.8 | 97.1 |
| 5 | 95 | 64.4 | 98.8 |
| 6 | 94 | 49.9 | 96.1 |
| 7 | 93 | 48.8 | 94.8 |
| 8 | 92 | 43.6 | 94.6 |
| 9 | 91 | 32.2 | 94.8 |
| 10 | 90 | 42.6 | 94.1 |
| 11 | 89 | 31.8 | 92.0 |
| 20 | 80 | 27.4 | 89.0 |

As shown by the data shown in Table A and FIG. 1, the strength of the shapes increase with an increase graphite content, until a graphite content of 5 wt. % is reached, after which the strength decreases.

Comparative Example I

Sintered shapes were produced and tested as in Example I, except Grade A $TiB_2$ powder was and the amounts of graphite and $TiB_2$ powders were adjusted as shown in Table B below. The flexural strengths and density are summarized in Table B, and in FIG. 1 for the flexural strength and FIG. 2 for the density. The density is shown as the percentage relative to the theoretical density. In FIGS. 1 and 2, the flexural strength and density values for this example are shown by the triangles (Δ). The dotted line FIG. 1 shows the strength values. The dotted line in FIG. 2 shows the density values.

TABLE B

| Graphite - Grade A Titanium Diboride Shapes | | | |
|---|---|---|---|
| Graphite (wt. %) | $TiB_2$ (wt. %) | Flexural Strength (psi × $10^3$) | Density (%) |
| 0 | 100 | 49.3 | 98.8 |
| 2 | 99 | 30.5 | 95.9 |
| 4 | 98 | 28.8 | 96.7 |
| 6 | 97 | 32.6 | 97.0 |
| 8 | 96 | 38.1 | 98.8 |
| 10 | 95 | 33.0 | 98.1 |
| 20 | 94 | 26.9 | 92.6 |

As shown by the above data of this example in Table B, the refractory powder has a high oxygen content (~2.5 wt. % oxygen), the addition of graphite powder provides no increase strength of the sintered shape. When compared with the practice of the invention (Table A), the strengths are significantly lower. This is clearly illustrated in FIG. 1.

Comparative Example II

Sintered shapes were made using the low oxygen content $TiB_2$ as in Example I using the same procedure except a carbon powder with a non-graphitic crystal structure was used in place of the graphite. The carbon powder was carbon black available under the trademark Sterling R, available from Cabot Corporation.

TABLE C

Carbon Powder - Titanium Diboride Shapes

| Carbon (wt. %) | TiB$_2$ (wt. %) | Flexural Strength (psi × 10$^3$) | Density (%) |
|---|---|---|---|
| 0 | 100 | 51.2 | 98.8 |
| 5 | 95 | 26.4 | 96.6 |
| 10 | 90 | 26.6 | 95.0 |
| 15 | 85 | 6.7 | 92.2 |

As seen by the above data, the use of a non-graphitic powder did not provide any improvement to the strength of the sintered shapes, but was actually detrimental to the strength of the shapes.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A method for producing a molded refractory shape comprising:

(a) providing a grain growth inhibiting powder of a graphite material having a crystal structure;
    (b) forming a refractory powder of a transition metal boride having less than 1.5 weight percent oxygen;
    (c) mixing between about 95 and about 98 weight percent, based upon the total weight of the mixture, of said refractory powder and between about 2 and about 5 weight percent, based upon the total weight of the mixture of said grain growth inhibiting powder; and
    (d) compressing the mixture at pressure and temperature sufficient to sinter the refractory powder.

2. The method of claim 1 wherein the refractory powder has an oxygen content less than about 0.5 weight percent.

3. The method of claim 1 wherein the refractory powder is TiB$_2$ powder.

4. The method of claim 1 wherein the average particle size of the refractory powder is between about 0.5 microns and 10 microns.

5. The method of claim 4 wherein the average particle size of the refractory powder is between about 1 micron and 5 microns.

6. The method of claim 1 wherein said graphite material is selected from the group consisting of synthetic graphite powders, natural graphite powders, and graphite fibers.

7. The method of claim 1 wherein the refractory powder is TiB$_2$ powder, and the grain growth inhibiting powder is synthetic graphite powder.

* * * * *

UNITED STATES PATENT AND TRADEMARK OFFICE
CERTIFICATE OF CORRECTION

PATENT NO. : 5,045,269
DATED : September 3, 1991
INVENTOR(S) : Raymond V. Sara It is certified that error appears in the above-identified patent and that said Letters Patent is hereby corrected as shown below:

Column 1, line 63, "4,308,114" should read "4,408,114".

Column 2, line 52, after the word "air", "." was left out.

Column 3, lines 53 and 59, "Mpa" should read "MPa".

Column 4, line 32, after the word "was" insert "used,".

Signed and Sealed this

Seventeenth Day of March, 1992

Attest:

HARRY F. MANBECK, JR.

*Attesting Officer*   *Commissioner of Patents and Trademarks*